United States Patent
Breuning et al.

(10) Patent No.: US 11,772,316 B2
(45) Date of Patent: Oct. 3, 2023

(54) EXTRUSION DEVICE HAVING INTERNAL COOLING

(71) Applicant: KRAUSSMAFFEI TECHNOLOGIES GMBH, Munich (DE)

(72) Inventors: Walter Breuning, Bergkirchen Bayern (DE); Mathias Geyer, München Bayern (DE)

(73) Assignee: KRAUSSMAFFEI EXTRUSION GMBH, Hannover (DE)

( * ) Notice: Subject to any disclaimer, the term of this patent is extended or adjusted under 35 U.S.C. 154(b) by 344 days.

(21) Appl. No.: 17/269,050

(22) PCT Filed: Aug. 27, 2019

(86) PCT No.: PCT/EP2019/072751
§ 371 (c)(1),
(2) Date: Feb. 17, 2021

(87) PCT Pub. No.: WO2020/048816
PCT Pub. Date: Mar. 12, 2020

(65) Prior Publication Data
US 2021/0276237 A1     Sep. 9, 2021

(30) Foreign Application Priority Data
Sep. 3, 2018   (DE) ............ 10 2018 121 387.5

(51) Int. Cl.
*B29C 48/90* (2019.01)
*B29C 48/09* (2019.01)
(Continued)

(52) U.S. Cl.
CPC ............ *B29C 48/902* (2019.02); *B29C 48/09* (2019.02); *B29C 48/2528* (2019.02);
(Continued)

(58) Field of Classification Search
CPC . B29C 48/09; B29C 48/2528; B29C 48/2665; B29C 48/325; B29C 48/87;
(Continued)

(56) References Cited

U.S. PATENT DOCUMENTS 3,327,350 A * 6/1967 Limbach ............... B29C 48/325
65/261
3,724,986 A * 4/1973 Wheeler ................. B29C 48/13
425/154

(Continued)

FOREIGN PATENT DOCUMENTS

CN     113787693 A  * 12/2021
DE     19843341 A1    4/2000
(Continued)

OTHER PUBLICATIONS

International Search Report for PCT/EP2019/072751 dated Nov. 27, 2019.
Written Opinion for PCT/EP2019/072751 dated Nov. 27, 2019.

*Primary Examiner* — Xiao S Zhao
*Assistant Examiner* — Joseph S Leyson
(74) *Attorney, Agent, or Firm* — Pearne & Gordon LLP

(57) ABSTRACT

An extrusion device includes a material inlet; a material outlet; a material guidance system; a body, which passes through the material outlet and a cross-sectional area through which the extrusion material is expelled from the material outlet changes; a drive device; a cooling line system for guiding coolant. A first part of the cooling line system is suitable for guiding the coolant along the axis, a second part is suitable for guiding the coolant out of the body and around the drive device, and a third part of the cooling line system guiding the coolant outwardly, into a discharge line for the coolant at an incline to the axis. The second part of the cooling line system adjoins the first part of the cooling line (Continued)

system, and the third part adjoins the second part against a flow direction of the extrusion material from the material inlet to the material outlet.

9 Claims, 1 Drawing Sheet

(51) Int. Cl.
  *B29C 48/325* (2019.01)
  *B29C 48/25* (2019.01)
  *B29L 23/00* (2006.01)
(52) U.S. Cl.
  CPC ........ *B29C 48/2665* (2019.02); *B29C 48/325* (2019.02); *B29L 2023/22* (2013.01)
(58) Field of Classification Search
  CPC ................. B29C 48/902; B29C 48/92; B29C 2948/92571; B29C 2948/92647; B29C 2948/92904; B29C 2948/92942
  See application file for complete search history.

(56) References Cited

U.S. PATENT DOCUMENTS

| | | |
|---|---|---|
| 4,154,563 A | 5/1979 | Johnson |
| 5,622,732 A | 4/1997 | Beckwith |
| 8,758,661 B2 | 6/2014 | Schneider |
| 2008/0095874 A1 | 4/2008 | Diekhaus et al. |
| 2008/0131542 A1 | 6/2008 | Schmuhl |
| 2010/0299908 A1 | 12/2010 | Hibert et al. |
| 2012/0205831 A1* | 8/2012 | Dohmann ............... B29C 48/92 264/40.6 |
| 2013/0093127 A1* | 4/2013 | Schneider ............... B29C 48/32 264/571 |

FOREIGN PATENT DOCUMENTS

| | | |
|---|---|---|
| DE | 102006051104 B3 | 1/2008 |
| DE | 102006049660 B3 | 2/2008 |
| DE | 102007059187 A1 | 6/2009 |
| DE | 102010025524 A1 | 12/2011 |

* cited by examiner

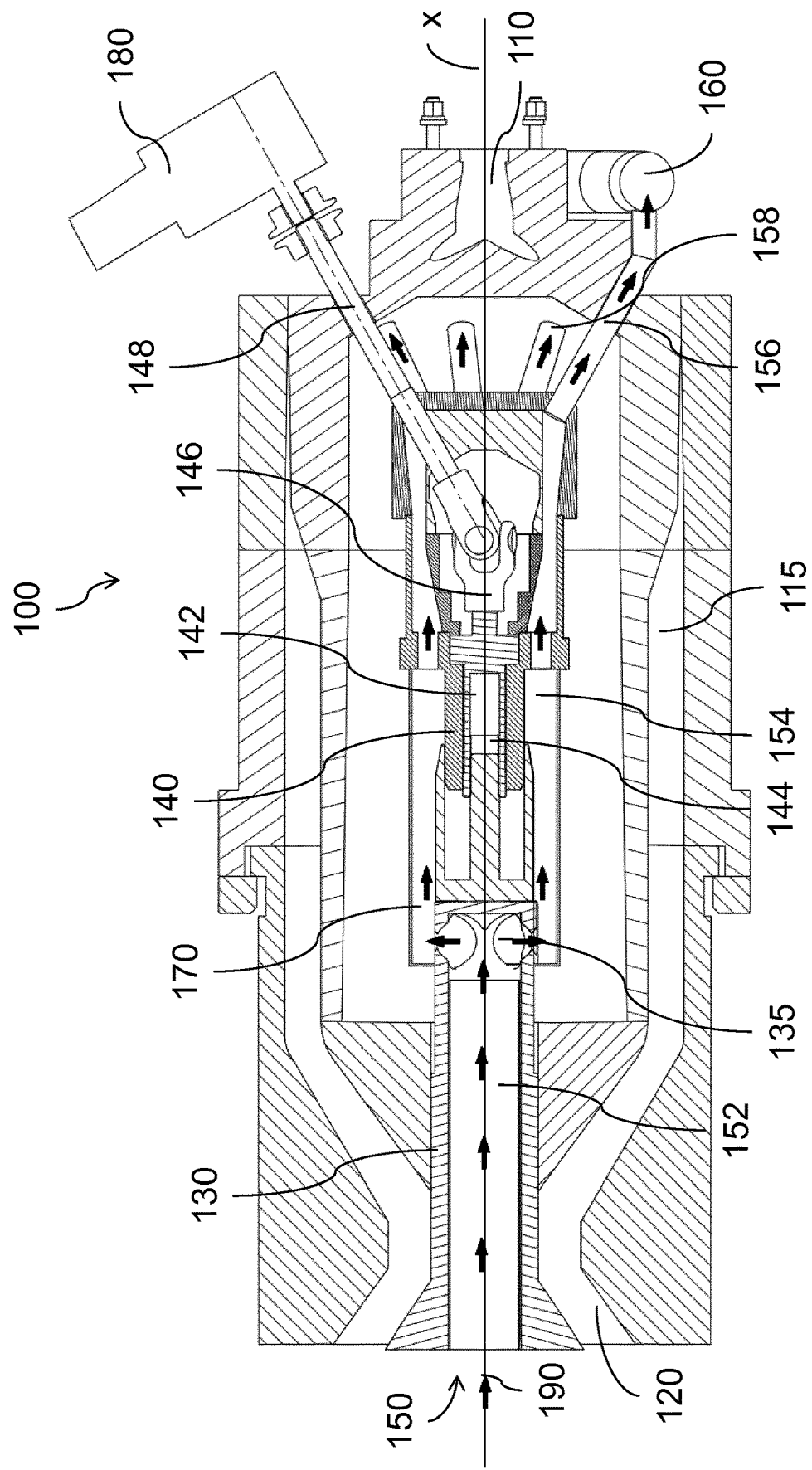

EXTRUSION DEVICE HAVING INTERNAL COOLING

CROSS-REFERENCE TO RELATED APPLICATIONS

This is a National Stage application of PCT international application PCT/EP2019/072751 filed on Aug. 27, 2019, which claims the priority of German Application No. 10 2018 121 387.5, filed Sep. 3, 2018, which are incorporated herein by reference in their entireties.

FIELD OF THE INVENTION

The present invention relates to an extrusion device having internal cooling, in particular an extrusion device in which a movable body is present, which can be moved for forming an extrudate, and in which an extrudate can be cooled from the interior by air.

BACKGROUND OF THE INVENTION

For adapting the form of an extrudate, it is known to use extruders in which a movable mandrel or body can be moved with respect to an outlet opening for the extrudate. Hereby, in particular the wall thickness and the diameter of extruded plastic pipes can be changed without the conveying of the extrusion material through the extruder having to be interrupted. Here, however, the difficulty exists of arranging the drive for the moving of the mandrel and the feeding of the extrusion material in such a way that no disadvantages occur in the manufacture.

The feeding of the extrusion material should namely lie in a line with the outlet opening for the extrudate, in order to prevent the extrusion material from having to be redirected too often. This leads to a more efficient operation of the system, because a lower pressure is necessary for the extrusion, whereby less energy is consumed. In addition, through the shorter dwell time of the extrusion material or melt, the quality of the extrudate is improved and the footprint of the extrusion line is reduced.

On the other hand, the movement of the mandrel is typically also controlled via a drive train, which lies in line with the path of the extrusion material through the extruder. In such a manner of driving, it is then no longer possible to feed the extrusion material in line with the outlet opening, whereby the advantages described above can no longer be realized.

In addition, it is advantageous if the extrudate can be cooled by air on the inner side of the extrudate, because this permits a faster further processing of the extrudate. Moreover, an internal cooling of the extrudate together with a cooling taking place from the exterior, e.g. through the application of water, leads to a more homogeneous cooling down, whereby the quality of the manufactured product can be improved.

Such an internal cooling can take place e.g. by the conducting of coolants, such as e.g. air, through the interior of the mandrel. In order to guarantee an efficient cooling of the extrudate, without cooling too intensively the extrusion material still to be formed in the tool, the coolant must, however, be fed into the mandrel from the ejection side of the extruder. A discharging is typically to take place in the region of the tool which is already provided for the drive of the mandrel or the feeding of the extrusion material.

BRIEF SUMMARY OF THE INVENTION

It is therefore an object of the present invention to indicate an extrusion device which permits a feeding of extrusion material, which has the above-mentioned advantages, by which the form of an extrudate can be changed during the running operation, and by which the extrudate can be efficiently cooled.

This problem is solved by the subject of the independent claims. Advantageous further developments are indicated in the dependent claims.

An extrusion device can comprise: a material inlet for feeding an extrusion material into the extrusion device; a material outlet, which is arranged opposite the material inlet along an axis, in order to expel the extrusion material from the extrusion device; a material guidance system for guiding the extrusion material from the material inlet to the material outlet; a body, which is arranged on the axis and is movable along the axis, passes through the material outlet and is designed in such a way that, as the body moves along the axis, a cross-sectional area through which the extrusion material is expelled from the material outlet changes; a drive device, arranged along the axis, for moving the body along the axis; a cooling line system for guiding coolant. Here, a first part of the cooling line system is arranged in the interior of the body and is suitable for guiding the coolant along the axis, a second part of the cooling line system is suitable for guiding the coolant out of the body away from the axis and for conducting said coolant around the drive device, and a third part of the cooling line system is suitable for guiding the coolant outwardly into a discharge line for the coolant at an incline to the axis. The second part of the cooling line system adjoins the first part of the cooling line system, and the third part of the cooling line system adjoins the second part of the cooling line system against a flow direction of the extrusion material from the material inlet to the material outlet.

In the extrusion device, the extrusion material is therefore guided from a material inlet to a material outlet, which lie on an axis. A body or mandrel, the position of which in the mass outlet determines the form, in particular the wall thickness, of the exiting extrudate, also lies on the axis. Through this arrangement, the extrusion device is configured in a compact manner and the extrusion material is conveyed as quickly as possible and without unnecessary redirections and pressure losses through the extrusion device, whereby energy is saved and the product quality can be improved. Moreover, through the movement of the body, the form of the extrudate can be changed without interrupting the conveying of the extrusion material.

Contrary to the flow direction of the extrusion material, the extrusion device can be flowed through by a coolant. The latter is introduced from the ejection side of the extrudate into the body or respectively is sucked into it. It therefore flows through the extrudate which is already expelled from the extrusion device, before it enters into the body and, in so doing, cools it. Here, the coolant can be gaseous. For example, air can be used as coolant. Alternatively, the coolant can also be guided equidirectionally to the flow direction of the extrusion material.

After the coolant has been conveyed internally in the body into the interior of the extrusion device, it is conducted radially outwards, e.g. perpendicularly to the movement axis of the body. This takes place in order to enable the conducting past the drive device, taking place hereafter, said drive device likewise being arranged on the movement axis of the body, in order to drive it. In the input region of the extrusion device, i.e. on the front face of the extrusion device, on which the material inlet is situated, the coolant is discharged at an incline outwards, i.e. for example at an angle of 30°, 45° or 60° with reference to the movement axis of the body.

The coolant can then leave the extrusion device on the front face and can be removed from the extrusion device in a discharge line.

This allows an extrudate to be cooled efficiently, and to nevertheless be able to provide a movable body and an axially arranged extrusion material feed.

The drive device can be configured in various ways here, as long as it is guaranteed that the feeding of the extrusion material taking place along the axis is not impeded.

The drive device can comprise a shaft lying on the axis, which shaft is connected at one end with the body in such a way that the latter, on a rotation of the shaft, is displaced along the axis. Moreover, the shaft can be connected at its other end, via at least one universal joint or toothed wheel, with a drive shaft which runs obliquely outwards with respect to the axis.

The movement of the body is therefore generated mechanically via a system of shafts. The outer drive shaft is driven here by a motor lying outside the extrusion device. Through the provision of universal joints (cardan shaft) or of bevel gears or crown wheels, the rotation of the drive shaft is transferred to a shaft of the drive device standing obliquely to the drive shaft. This shaft of the drive device lies in line with the body, the material inlet and the material outlet. By rotation of the interior shaft, a movement of the body along the axis can therefore be brought about easily, e.g. through a spindle-shaped configuration of the connection of shaft and body, which makes provision that the body, on rotation of the shaft, screws onto or respectively unscrews from the latter. At the same time, through the inclined arrangement of the drive shaft, it is prevented that the motor for driving the shaft is situated in the region of the material inlet. Therefore, through a simple construction, it is made possible simultaneously to cool the extrudate, to change the form of the extrudate and to feed the extrusion material in as loss-free a manner as possible.

Alternatively, the drive device can have means for the electric, pneumatic or hydraulic moving of the body and/or can be suitable for moving the body by means of cables or chain drives. Also in the case of electric motors lying within the extrusion device or in the case of pneumatic or respectively hydraulic devices, the feeding current lines or lines directing hydraulic fluid or respectively gas can be laid so that no impairment occurs to the axial feeding of the extrusion material. The same applies to the redirecting of mechanical drives by means of cables or chain drives.

The cooling line system can be suitable for guiding the coolant in the second part and/or third part with reference to the axis symmetrically outwardly. Through a symmetrical guiding of the coolant, the influence acting on the extrusion device can be reduced.

The drive device and a connection between the drive device and body can be arranged in a cavity of the extrusion device extending along the axis, openings can lead out of the body, in particular symmetrically with respect to the axis, out of the first part of the cooling line system arranged in the interior of the body, into the cavity, wherein the second part of the cooling line system comprises the openings and the cavity. Through the provision of a cavity within the extrusion device, into which the coolant flows out from the body, the coolant can be guided in a simple manner around the drive device which is arranged in the cavity. Hereby, a saving can be made with regard to material for lines. Moreover, at the same time a cooling of the drive device can be achieved, without an additional cooling section becoming necessary.

The third part of the cooling line system can comprise a plurality of conduits, which are connected with the cavity at an end of the cavity lying opposite the connection between drive device and body along the axis and, in particular symmetrically with respect to the axis, lead outwardly at an incline. The coolant is therefore fed out of the cavity to the discharge line in a simple manner, without interfering with the feeding of extrusion material along the axis.

The cooling line system can be suitable for the guiding of air. Through the use of air as coolant, the cooling can take place in a favourably priced and environmentally friendly manner.

The extrusion device can be suitable for the producing of plastic pipes, i.e. the cross-sectional area which is left free from the body in the material outlet is small. With a corresponding, e.g. conical, configuration of the end region of the body, by moving the body, the thickness of the ring and thereby the thickness of the extruded pipes can then be adjusted, without stopping the extrusion.

A method for obtaining an extrudate by means of an extrusion device as was described above comprises: guiding an extrusion material from the material inlet to the material outlet for the producing of an extrudate, and guiding a coolant into the first part of the cooling line system, from there into the second part of the cooling line system, from there into the third part of the cooling line system and from there into the discharge line for the coolant, in order to cool the extrudate. In this way, efficiently cooled and thereby rapidly further-processable extrudates can be produced.

BRIEF DESCRIPTION OF THE DRAWINGS

The invention is described in detail below with reference to the enclosed figure. However, the following description is only by way of example. The subject of the invention is only determined by the subject of the claims. There are shown:

FIG. 1 a schematic illustration of an extrusion device.

DESCRIPTION OF EXAMPLE EMBODIMENTS

In FIG. 1 a cross-section through an extrusion device 100 is illustrated schematically. The illustrated extrusion device 100 concerns a device for producing plastic pipes from an extrusion material. It is self-evident that the function principles of the extrusion device 100 explained below also apply to devices which produce different extrudates, as long as the construction of these devices corresponds to the subject of the claims.

In the extrusion device 100 illustrated in FIG. 1, an extrusion material is fed from the right via a material inlet 110, as is known from the prior art. The extrusion material is then guided via a material line system 115 through the extrusion device 100. As illustrated in FIG. 1, the material line system can lead in several line ducts through the extrusion device 100, which in particular regions can also surround the entire circumference of the extrusion device 100.

At the left end of the extrusion device 100 illustrated in FIG. 1, the extrusion material is expelled out of a material outlet 120. The material outlet 120 is formed here through an opening in the extrusion device 100, the outer dimensions of which determine the outer circumference of the extrudate exiting from the extrusion device 100.

In order to produce extrudates with an interior cavity, such as for instance plastic pipes, the extrusion device 100 has a body 130 (also designated a mandrel), which penetrates the material outlet 120. The extrusion material is pressed at the end of its passage through the extrusion device 100 therefore between the wall of the material outlet 120 and the body 130 and thereby brought into its final form. In FIG. 1 the cross-sectional area is annular, which is left free from the body 130 in the material outlet 120. Thereby, the extrusion device 100 is suitable for the production of pipes. It is self-evident that through a different configuration of material outlet 120 and of the end of the body 130 penetrating the material outlet 120, a different cross-sectional geometry of the extrudate can also be produced.

In order to enable a change to the passage area of the extrusion material through the material outlet 120 with continual conveying of the extrusion material through the material guidance system 115 of the extrusion device 100, the body 130 is mounted movably in the extrusion device 100. Thus, e.g. on drawing in of the body 130 into the extrusion device 100 (i.e. on moving of the body 130 to the right in FIG. 1), the distance between the cone-shaped end of the body 130 and the likewise cone-shaped wall of the material outlet 120 reduces. Thereby, the wall thickness of the extruded pipes can be reduced. Through the opposite movement, the wall thickness is enlarged.

For this, the body 130 is moved along an axis x on which also the material inlet 110 and the material outlet 120 are arranged. This permits the extrusion material to be guided in a symmetrical manner through the material guidance system 115, whereby pressure losses or irregular material distributions or durations of stay in the material guidance system 115 are prevented. If the material inlet 110 were namely arranged at an angle or with an offset with respect to the axis x, it would be necessary to guide the extrusion material over unequally long paths or respectively longer paths and redirections to the material outlet 120, which can be prevented through the axial arrangement of material inlet 110 and material outlet 120.

In the middle of the extrusion device 100, i.e. between the body 130 and the material inlet 110, a drive device 140 is arranged which serves to move the body 130 axially with respect to the material outlet 130 and along the axis x. The drive device 140 is also arranged on the axis x, in order to enable a radially symmetrical construction of the material guidance system 115. As shown in FIG. 1, the material guidance system 115 therefore runs around the components drive device 140 and body 130 arranged on the central axis x.

The drive device 140 is arranged and designed here in such a way that it is not obstructive to a feeding of the extrusion material to the material guidance system 115 through the material inlet 110, which is also arranged on the axis x. The drive device 140 can be configured differently here. As described below in detail, in FIG. 1 a cardan shaft, operated via a motor arranged externally on or outside the extrusion device 100, is the drive device 140. However, the drive device 140 is not restricted to this example.

For example, the drive device 140 can also concern any type of electric, hydraulic or pneumatic drive which is able to move the body 130 along the axis x. It can concern e.g. the combination of an electric motor with a spindle, wherein the electric motor drives the spindle, connected with the body 130, in such a way that it moves the body 130 by screwing into and out of the latter. Alternatively, hydraulic or pneumatic cylinders can also be present, which displace the body 130 in a manner known per se.

The supply lines for this type of drive devices 140 (i.e. cable or lines guiding hydraulic fluid or gas) can be easily arranged in such a way that they impair neither the axial arrangement of material inlet 110, drive device 140, body 130 and material outlet 120 nor a possible radially symmetrical configuration of the material guidance system 115.

Likewise, a displacement of the body 130 can also be brought about via mechanical force redirecting components from the exterior, such as for instance cables or chain drives. The drive device 140 then consists of the connections of these force redirecting components onto the body 130. The force redirecting components are in turn guided through the extrusion device in such a way that no impairment occurs to the desired arrangement of material inlet 110, body 130, material outlet 120 and material guidance system 115.

As shown in FIG. 1, the drive of the body 130 can, however, also take place via a shaft system in which a shaft 142 of the drive device 140 is driven via a drive shaft 148 connected with a motor 180.

The shaft 142 is connected here by a first end 144 with the body 130 in such a way that a rotation of the shaft 142 leads to an axial displacement of the body 130. Such connections are known from the prior art. An example for this is a screw mounted at the end 144 of the shaft 142, which screw runs in a corresponding thread mounted at the end of the body 130. As the shaft 142 is stationary, a rotation of the shaft 142, according to the rotation direction, leads to the screw screwing into or out from the thread and thereby moves the body 130 towards the shaft 142 or away therefrom.

The end 146 of the shaft 142 lying opposite the first end 144 of the shaft 142 is connected with the drive shaft 148 in such a way that rotations of the drive shaft 148 are transferred to the shaft 142. In order to enable the advantageous axial arrangement of material inlet 110, body 130 and material outlet 120, the drive shaft 148 runs at an incline outwardly with respect to the axis x, e.g. at an angle from the range of 20° to 70°, e.g. at 30°, 45° or 60°. The drive shaft 148 is arranged here in a region in which the desired guiding of the material guidance system 115 is not impaired detrimentally, therefore in particular in the part of the extrusion device 100 adjacent to the material inlet 110, in which the material guidance system 115 can consist of several individual lines, which permit the drive shaft 148 to be guided through these.

The inclined arranging of the drive shaft 148 with respect to the axis x therefore permits a powerful drive, less error-prone, and able to be constructed at a favourable cost, to be provided for the body 130, without impairing the advantageous axial arrangement of material inlet 110, body 130 and material outlet 120.

As shown in FIG. 1, a connection can take place between drive shaft 148 and shaft 142 through one or more universal joints (cardan shaft). However, it is also possible to connect the ends of shaft 142 and drive shaft 148, which are abutting one another, via an angular gear with bevel gears and/or crown wheels. In this case, it is also possible to arrange the drive shaft 148 with any desired angle between 0° and 180° as long as this does not impair the desired arrangement of the remaining components of the extrusion device 100.

As third main component in addition to the actual extrusion line and the movable body 130 and its drive, the extrusion device 100 comprises a cooling line system 150 by which a coolant, preferably a cooling gas such as air for instance, can be conducted contrary to the flow direction of the extrusion material through the body 130. The flow of the coolant through the extrusion device 100 is marked in FIG. 1 by the arrows 190. Alternatively, the coolant can, however, also run through the cooling line system 150 equidirectionally to the flow direction of the extrusion material.

As shown in FIG. 1, the interior of the body 130 is suitable for directing into the interior of the extrusion device 100 the coolant which is fed from outside the extrusion device 100. For this, this body 130 has corresponding lines or is manufactured to be hollow, i.e. it consists only of a wall, the thickness of which is sufficient in order to withstand the forces exerted by the extrusion material onto the body 130.

The coolant therefore flows via the interior of the extrudate, such as for instance of an extruded pipe, into the body 130. Thereby it is possible to cool the extrudate, on leaving the extrusion device 100, not only from the exterior, but also from the interior. In addition, the end of the body 130 arranged in the material outlet 120 can also be cooled, so that the extrusion material is already cooled on passage through the material outlet 120, whereby the extrudate becomes stable and further-processable more quickly.

The inner region of the body 130 therefore corresponds to a first part 152 of the cooling line system 150, in which the coolant is guided along the axis x in order to enable a cooling of the extrudate. In addition, a sleeve can be inserted into the body 130, which prevents the body 130 from being cooled by the coolant flowing through it.

Following this first part 152 of the cooling line system 150, a second part 154 and a third part 156 adjoin, which serve to feed the coolant through the extrusion device 100 to a discharge line 160 for the coolant, without impairing the desired arrangement of the remaining components of the extrusion device 100. In particular, the advantageous axial arrangement of material inlet 110, body 130 and material outlet 120 is not to be impaired.

In the second part 154 of the cooling line system 150, the coolant is guided firstly, e.g. radially, away from axis x outwardly, in order to guide it hereafter past the drive device 140. This is necessary, because the advantageous mobility of the body 130 along the axis x leads to the drive device 140 or at least parts thereof being also arranged on the axis x.

A structurally particularly simple configuration of the second part 154 of the cooling line system 150 is illustrated in FIG. 1. Here, the coolant exits from openings 135 arranged in the interior end of the body 130, preferably radially symmetrically and/or perpendicularly to the axis x, out of the body 130 into a cavity 170, which is situated in the central region of the extrusion device 100. The drive device 140 is situated in the cavity 170 on holding devices suitable for this. For example, the shaft 142 can be held solely through the connection to the body 130 and to the drive shaft 148, mounted in a stable manner, in the cavity 170. If required, further means, basically known from the prior art, for supporting the drive device 140 can also be present in the cavity 170, in particular in a different configuration of the drive device. Examples for this can be ball bearings fixed by struts or simple bracings for fixed motors.

Therefore, after the exit from the openings 135 of the body 130, the coolant can flow through further through the cavity 170 in the direction of the material inlet 110. Here, for example, a cooling can also take place of the drive device 140 arranged in the cavity 170. Alternatively, however, the coolant can also be conducted past the drive device 140 via pipelines or suchlike. This indeed places greater requirements on the arrangement of the individual components of the extrusion device 100 and leads to more use of material, but can be advantageous, however, e.g. with regard to the tightness of the cooling line system 150.

The third part 156 of the cooling line system 150 adjoins the second part 154 of the cooling line system 150. In this third part 156, which is already situated in the vicinity of the material inlet 110 and of the part of the material guidance system 115 leading away therefrom, the coolant is guided, preferably radially symmetrically, at an incline outwardly away from the axis x, e.g. at an angle in the range between 20° and 70°, e.g. 30°, 45° or 60°. This permits the coolant to be guided laterally with respect to the axially arranged material inlet 110 out from the extrusion device 100 and to be fed into the discharge line 160.

It is therefore made possible to guide the coolant for an internal cooling of the extrudate and of the body 130 through the entire extrusion device 100, without impairing the advantageous arrangement of extrusion line and movable body 130.

As shown in FIG. 1, the third part 156 of the cooling line system 150 can consist of a plurality of preferably radially symmetrically arranged conduits 158, which lead out of the cavity 170 into a discharge pipe of the discharge line 160, which is arranged around the material inlet 110. This permits an efficient discharging of the coolant.

With the extrusion device 100 therefore by guiding an extrusion material from the material inlet 110 to the material outlet 120 in interaction with the movable body 130 an extrudate can be produced, the form of which can be changed through movements of the body 130 during the extrusion. At the same time, through a flowing through of the extrusion device 100, and in particular of the body 130, contrary to or in the same direction as the flow direction of the extrusion, an internal cooling of the extrudate can be provided. Through the adapting of the arrangement of the drive train for the movement of the body 130 to the advantageous axial arrangement of material inlet 110, body 130 and material outlet 120, and through the successive widening of the flow path of the coolant away from the axis x, this can be achieved without producing disadvantages with regard to the conveying of the extrusion material through the extrusion device 100.

LIST OF REFERENCE NUMBERS

100 extrusion device
110 material inlet
115 material guidance system
120 material outlet
130 body
135 openings in the body
140 drive device
142 shaft
144 one end of the shaft
146 other end of the shaft
148 drive shaft
150 cooling line system
152 first part of the cooling line system
154 second part of the cooling line system
156 third part of the cooling line system
160 discharge line
170 cavity
180 motor
190 flow path of the coolant
x axis

What is claimed is:
1. An extrusion device (100) with
 a material inlet (110) for feeding an extrusion material into the extrusion device (100);
 a material outlet (120), which is arranged opposite the material inlet (110) along an axis (x), in order to expel the extrusion material from the extrusion device (100);
 a material guidance system (115) for guiding the extrusion material from the material inlet (110) to the material outlet (120);

a body (130), which is arranged on the axis (x) and is movable along the axis (x), which passes through the material outlet (120) and is designed in such a way that, as the body (130) moves along the axis (x), a cross-sectional area through which the extrusion material is expelled from the material outlet (120) changes;

a drive device (140), arranged along the axis (x), for moving the body (130) along the axis (x);

a cooling line system (150) for guiding coolant; characterized in that a first part (152) of the cooling line system (150) is arranged in the interior of the body (130) and is suitable for guiding the coolant along the axis (x);

a second part (154) of the cooling line system (150) is suitable for guiding the coolant out of the body (130) away from the axis (x) and for conducting said coolant around the drive device (140);

a third part (156) of the cooling system (150) is suitable for guiding the coolant outwardly into a discharge line (160) for the coolant at an incline to the axis (x); and the second part (154) of the cooling line system (150) adjoins the first part (152) of the cooling line system (150), and the third part (156) of the cooling line system (150) adjoins the second part (154) of the cooling line system (150) against a flow direction of the extrusion material from the material inlet (110) to the material outlet (120).

2. The extrusion device (100) according to claim 1, wherein the drive device (140) comprises a shaft (142) lying on the axis (x), which shaft is connected at one end (144) with the body (130) in such a way that the latter, on a rotation of the shaft (142), is displaced along the axis (x); and the shaft (142) at its other end (146) is connected via at least one universal joint or toothed wheel with a drive shaft (148), which runs at an incline outwardly with respect to the axis (x).

3. The extrusion device (100) according to claim 1, wherein the drive device (140) has means for the electric, pneumatic or hydraulic moving of the body (130); and/or the drive device (140) is suitable for moving the body (130) by means of cables or chain drives.

4. The extrusion device (100) according to claim 1, wherein the cooling line system (150) is suitable for guiding the coolant in the second part (154) and/or in the third part (156) symmetrically outwards with respect to the axis (x).

5. The extrusion device (100) according to claim 1, wherein the drive device (140) and a connection between the drive device (140) and the body (130) are arranged in a cavity (170) of the extrusion device (100) extending along the axis (x);

openings (135) out of the body (130), with respect to the axis, lead out of the first part (152) of the cooling line system (150), arranged in the interior of the body (130), into the cavity (160); and the second part (154) of the cooling line system comprises the openings (135) and the cavity (170).

6. The extrusion device (100) according to claim 5, wherein the third part (156) of the cooling line system (150) comprises a plurality of conduits (158) which, at an end of the cavity (170) lying opposite the connection between drive device (140) and body (130) along the axis (x), are connected with the cavity (170) and lead obliquely outwards, symmetrically with respect to the axis (x).

7. The extrusion device (100) according to claim 1, wherein the cooling line system (150) is suitable for the guiding of air.

8. The extrusion device (100) according to claim 1, wherein the extrusion device (100) is suitable for producing plastic pipes.

9. A method for obtaining an extrudate by means of the extrusion device (100) according to claim 1, comprising:

guiding an extrusion material from the material inlet (110) to the material outlet (120) for producing an extrudate; and guiding a coolant into the first part (152) of the cooling line system (150), from there into the second part (154) of the cooling line system (150), from there into the third part (156) of the cooling line system (150) and from there into the discharge line (160) for the coolant, in order to cool the extrudate.

\* \* \* \* \*